(12) United States Patent
Nakaho et al.

(10) Patent No.: US 7,573,632 B2
(45) Date of Patent: Aug. 11, 2009

(54) ELECTROCHROMIC MIRROR

(75) Inventors: Junichi Nakaho, Aichi (JP); Masao Ayabe, Aichi (JP); Masaharu Hattori, Aichi (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 134 days.

(21) Appl. No.: 10/560,614

(22) PCT Filed: Jun. 16, 2004

(86) PCT No.: PCT/JP2004/008435

§ 371 (c)(1), (2), (4) Date: Mar. 28, 2007

(87) PCT Pub. No.: WO2004/114009

PCT Pub. Date: Dec. 29, 2004

(65) Prior Publication Data

US 2007/0268551 A1  Nov. 22, 2007

(30) Foreign Application Priority Data

Jun. 18, 2003 (JP) .............................. 2003-173100
Mar. 1, 2004 (JP) .............................. 2004-056386

(51) Int. Cl.
*G02F 1/153* (2006.01)
*G02F 1/15* (2006.01)

(52) U.S. Cl. ...................... 359/273; 359/265; 359/270; 359/267

(58) Field of Classification Search ................ 359/273, 359/365, 266, 267, 269, 270, 271
See application file for complete search history.

(56) References Cited

U.S. PATENT DOCUMENTS 3,844,636 A    10/1974  Maricle et al.
4,416,517 A *  11/1983  Beall et al. .................. 359/270
4,465,339 A     8/1984  Baucke et al.

(Continued)

FOREIGN PATENT DOCUMENTS

JP          56-133719 A      10/1981

(Continued)

OTHER PUBLICATIONS

European Search Report dated Nov. 14, 2008 issued in corresponding European Patent Application No. 04 74 5976.

*Primary Examiner*—Alicia M Harrington
*Assistant Examiner*—Brandi N Thomas
(74) *Attorney, Agent, or Firm*—Roberts Mlotkowski Safran & Cole, P.C.; Thomas W. Cole (57) ABSTRACT

An electrochromic mirror 10 has a simple construction wherein only two layers of films, namely an electrochromic film 14 and an electrically conductive light reflecting film 16 are formed on a glass substrate 12, and a film thickness and film quality and the like of the electrochromic film 14 and the electrically conductive light reflecting film 16 hardly affects performance. Therefore, this leads to easy manufacturing at low cost. Further, since the electrochromic mirror has such a construction that light introduced from a surface side of the glass substrate 12 is reflected by the electrically conductive light reflecting film 16 formed on a back of this glass substrate 12, occurrence of a double image is prevented.

12 Claims, 3 Drawing Sheets

U.S. PATENT DOCUMENTS 5,668,663 A * 9/1997 Varaprasad et al. ......... 359/608
6,203,154 B1   3/2001 Kobayashi et al.

FOREIGN PATENT DOCUMENTS

| | | |
|---|---|---|
| JP | 62-2587 Y2 | 1/1987 |
| JP | 2672083 B2 | 7/1997 |
| JP | 10-500225 A | 1/1998 |
| JP | 2002-529794 A | 9/2002 |
| JP | 1 488 957 A1 | 12/2004 |
| WO | 99/32926 A1 | 7/1999 |
| WO | 00/28374 A1 | 5/2000 |

* cited by examiner

PRIOR ART

FIG. 3

PRIOR ART

ELECTROCHROMIC MIRROR

TECHNICAL FIELD

The present invention relates to an indoor or outdoor rearview mirror applied to vehicles such as an automobile and, more particularly, to an electrochromic mirror the reflectivity of which can be changed by applying a voltage.

BACKGROUND ART

Conventionally, in a rearview mirror applied to vehicles such as an automobile, a so-called "electrochromic mirror" which enables reduction of glare from the headlights of a following car at night by electrically changing the reflectivity thereof has been known (see, for example, Japanese Utility Model Application Publication (JP-Y) No. 62-2587).

Figure 2:
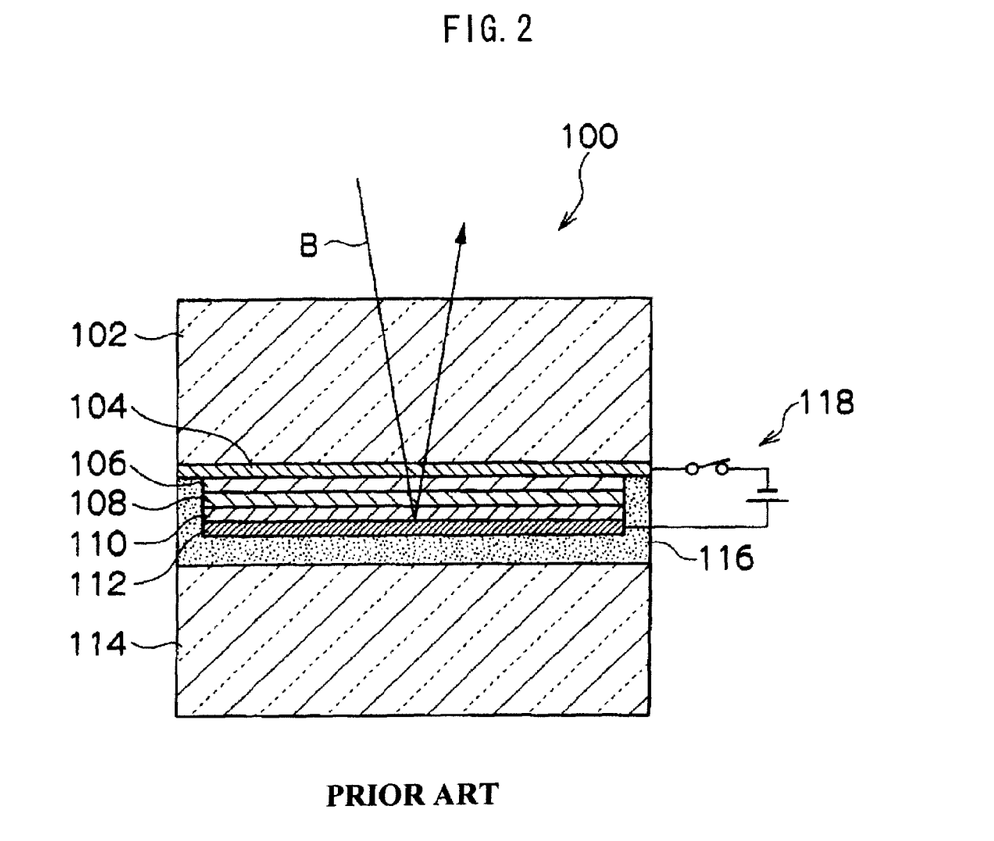
FIG. 2 is a cross-sectional view showing the construction of a conventional electrochromic mirror.

As shown in FIG. 2, an electrochromic mirror 100 disclosed in JP-Y No. 62-2587 has a construction whereby thin films of a transparent electrode 104, iridium hydroxide (Ir(OH)$_3$) 106, tantalum pentaoxide (Ta$_2$O$_5$) 108, tungsten trioxide (WO$_3$) 110, and an aluminum (Al) electrode 112 are successively laminated on the back of a glass substrate 102 by means, for example, of vacuum deposition and, at the same time, a glass plate 114 for protecting the aforementioned respective thin films is applied to the side of the aluminum (Al) electrode 112 with a sealer (adhesive) 116. When a voltage is applied between the transparent electrode 104 and the aluminum (Al) electrode 112 by an electric source apparatus 118, the respective thin films of iridium hydroxide (Ir(OH)$_3$) 106 and tungsten trioxide (WO$_3$) 110 are coloring-reacted to change the reflectivity of the electrochromic mirror 100 (see arrow B of FIG. 2).

However, in this electrochromic mirror 100, unless film thicknesses and film qualities of the aforementioned respective thin films are balanced, a thin film that has been colored once does not revert to its original state in some cases. Moreover, since performance is sensitive to the influence of variations in the respective film thicknesses, difficult manufacturing conditions are imposed. Further, since the multi-layered film is formed by vacuum deposition, there is also a problem of high costs.

On the other hand, an electrochromic mirror having a construction whereby reflectivity is changed by a coloring reaction of a so-called "electrochromic solution", which is an electrically colored solution, is also known (see, for example, Japanese Patent No. 2672083).

Figure 3:
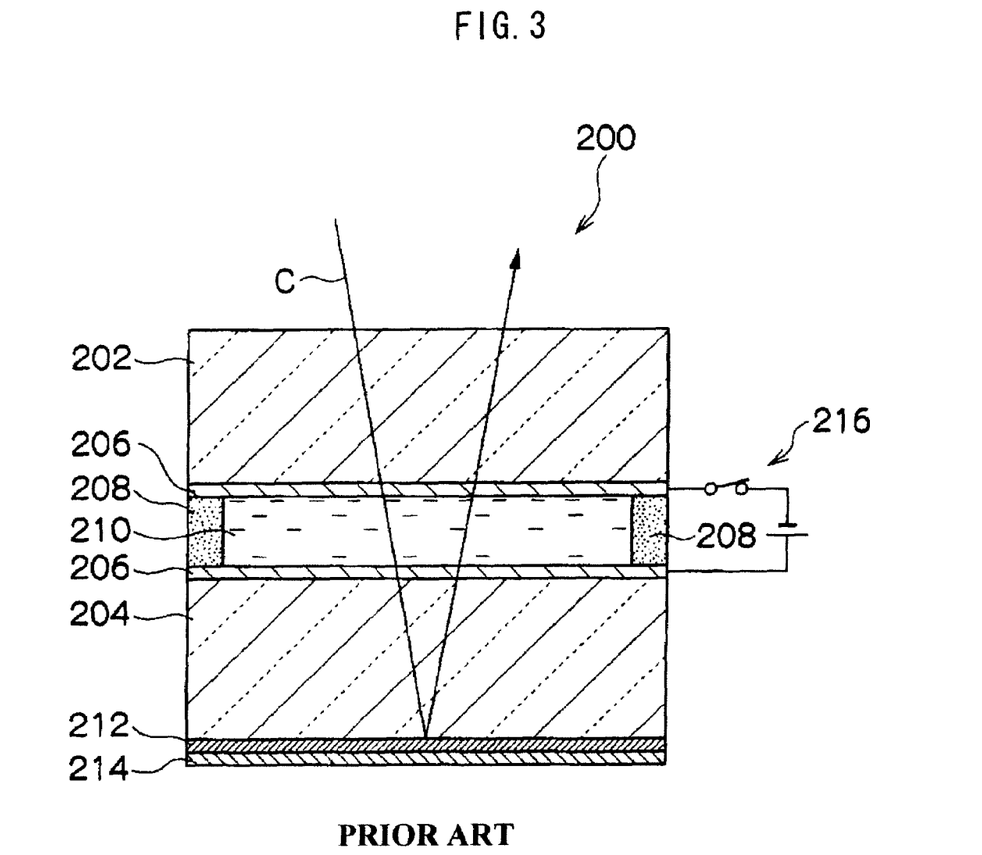
FIG. 3 is a cross-sectional view showing the construction of a conventional electrochromic mirror.

As shown in FIG. 3, in an electrochromic mirror 200 disclosed in Japanese Patent No. 2672083, two glass substrates 202 and 204 are disposed parallel at a constant interval, and transparent electrode films 206 are formed on respective internal surfaces facing each other of these two glass substrates 202 and 204. An electrochromic solution 210 is sealed in the interior of a space (cell) sealed with a sealing agent 208, between these respective transparent electrode films 206. Further, a reflecting film 212 and a protection coating film 214 are formed on the back (lower surface in FIG. 3) of the glass substrate 204. When a voltage is applied between the respective transparent electrode films 206 by an electric source apparatus 216, the electrochromic solution 210 is coloring-reacted, and the reflectivity of the electrochromic mirror 200 is changed.

However, in this electrochromic mirror 200, unless the two glass substrates 202 and 204 are applied parallel to each other via a sealing agent 206 with high precision, the image of reflected light (see arrow C in FIG. 3) from the reflecting film 212, and the image of the reflected light at a surface (the upper surface in FIG. 3) of the glass substrate 202 are not consistent, and a so-called double image is generated, leading to a mirror which is extremely difficult to see. In particular, a mirror for an automobile generally uses a curved mirror and, in this case, there are the drawbacks that manufacturing is extremely difficult, and costs increase.

Patent Reference 1: JP-Y No. 62-2587
Patent Reference 2: Japanese Patent No. 2672083

DISCLOSURE OF INVENTION

Problems to be Solved by the Invention

In view of the aforementioned facts, the present invention provides an electrochromic mirror which is easy to manufacture at low cost, does not generate a double image, and is simple with high performance.

Means to Solve the Problems

A first aspect of the present invention is an electrochromic mirror including a transparent substrate wherein an electrochromic film which is reduction-colored is formed on the back thereof, and an electrically conducive light reflecting film which is permeable to hydrogen atoms and has electrical conductivity is formed on the electrochromic film; a substrate which has an electrically conductive part having electrical conductivity on at least one side, and is provided in a vicinity of the transparent substrate in a state where the electrically conductive part faces the electrically conductive light reflecting film; and an electrolysis solution which contains at least a hydrogen ion and a material oxidizable with a neutral molecule or an anion, and is sealed between the electrically conductive light reflecting film of the transparent substrate and the electrically conductive part of the substrate.

A second aspect of the present invention is an electrochromic mirror including a transparent substrate wherein an electrochromic film which is reduction-colored is formed on the back thereof, and an electrically conductive light reflecting film which is permeable to lithium atoms and has electrical conductivity is formed on the electrochromic film; a substrate which has an electrically conductive part having electrical conductivity on at least one side, and is provided in a vicinity of the transparent substrate in a state where the electrically conductive part faces the electrically conductive light reflecting film; and an electrolysis solution which contains at least a lithium ion and a material oxidizable with a neutral molecule or an anion, and is sealed between the electrically conductive light reflecting film of the transparent substrate and the electrical conductive part of the substrate.

BEST MODE FOR CARRYING OUT THE INVENTION

An electrochromic mirror of a first aspect of the present invention is characterized in having a transparent substrate wherein an electrochromic film which is reduction-colored is formed on the back thereof, and an electrically conductive light reflecting film which is permeable to hydrogen atoms and has electrical conductivity is formed on the electrochromic film; a substrate which has an electrical conductive part having electrical conductivity on at least one side, and is provided in a vicinity of the transparent substrate in a state where the electrically conductive part faces the electrically conductive light reflecting film; and an electrolysis solution which contains at least a hydrogen ion and a material oxidizable with a neutral molecule or an anion, and is sealed between the electrically conductive light reflecting film of the transparent substrate and the electrically conductive part of the substrate.

In the electrochromic mirror of the first aspect of the present invention, the electrolysis solution is sealed between the electrically conductive light reflecting film formed on the transparent substrate, and the electrically conductive part of the substrate. This electrolysis solution contains at least a hydrogen ion, and a material oxidizable with a neutral molecule or an anion.

Herein, when a negative voltage is applied to the electrically conductive light reflecting film and, at the same time, a positive voltage is applied to the electrically conductive part of the substrate, for example, by an electric source apparatus (battery etc.) mounted in a vehicle, the hydrogen ions contained in the electrolysis solution move to the side of the electrically conductive light reflecting film, pass as hydrogen atoms through the electrical conductive light reflecting film, and move to the side of the electrochromic film. For this reason, the following reduction reaction occurs in the electrochromic film.

$$x\mathrm{H}^+ + MO + e^- \underset{Decoloring}{\overset{}{\rightleftarrows}} \mathrm{H}xMO \underset{Coloring}{} \quad (1)$$

H$^+$ is a hydrogen ion, MO is a material for the electrochromic film, and e$^-$ is an electron. The material (MO) for this electrochromic film is most preferably tungsten trioxide (WO$_3$), molybdenum trioxide (MoO$_3$), or a mixture containing at least one of them.

On the other hand, as described above, the electrolysis solution contains a material oxidizable with a neutral molecule or an anion, and this is a construction ensuring the aforementioned reduction reaction of the electrochromic film.

That is, when an oxidizing neutral molecule is contained in the electrolysis solution, supposing this neutral molecule to be A, the following oxidation reaction occurs in a vicinity of the electrically conductive part of the substrate to which a positive voltage is applied, in an electrolysis solution.

$$A - e^- \rightleftarrows A^+ \quad (2)$$

In addition, when an oxidizing anion is contained in an electrolysis solution, supposing this anion to be B, the following oxidation reaction occurs in a vicinity of the electrically conductive part of the substrate to which a positive voltage is applied, in an electrolysis solution.

$$B^- - e^- \rightleftarrows B \quad (3)$$

Therefore, for example, when the material for the electrochromic film is WO$_3$, and an oxidizing neutral molecule is contained in the electrolysis solution, the whole reaction is as shown below, and the electrochromic film is reduction-colored.

$$x\mathrm{H}^+ + \mathrm{WO}_3 + xA \underset{Decoloring}{\overset{}{\rightleftarrows}} \mathrm{H}x\mathrm{WO}_3 + xA^+ \underset{Coloring}{} \quad (4)$$

In addition, for example, when the material for the electrochromic film is WO$_3$, and an oxidizing anion is contained in the electrolysis solution, the whole reaction is as shown below, and the electrochromic film is reduction-colored.

$$x\mathrm{H}^+ + \mathrm{WO}_3 + x\mathrm{B}^- \underset{Decoloring}{\overset{}{\rightleftarrows}} \mathrm{H}x\mathrm{WO}_3 + x\mathrm{B} \underset{Coloring}{} \quad (5)$$

(In order to match the formula (1) and the formula (2), an anion is contained in the electrolysis solution. The electrolysis solution does not need to be colored by the reaction in the electrolysis solution.)

Therefore, since light which is introduced into the transparent substrate from a surface side (a side opposite to a side on which the electrochromic film and the electrically conductive light reflecting film are formed) of the transparent substrate, and is reflected by the electrically conductive light reflecting film is dimmed by passage through the colored electrochromic film, a reflectivity of the electrochromic mirror changes and the anti-glaring effect is exerted.

Moreover, the present electrochromic mirror has a simple construction wherein only two layers of films, namely the electrochromic film and the electrically conductive light reflecting film are formed on the transparent substrate, and the film quality, film thickness and the like of these respective films hardly affect performance. Therefore, this leads to easy manufacturing at low cost.

In addition, since the electrochromic mirror has such a construction that light introduced into the transparent substrate is reflected by the electrically conductive light reflecting film formed on the back of this transparent substrate, occurrence of a double image is prevented.

Further, as the electrolysis solution, a highly reactive liquid is generally used in some cases, and the materials used in the electrochromic film such as tungsten trioxide and the like may be dissolved in the electrolysis solution little by little. Even in such a case, in the present electrochromic mirror, since the electrochromic film is formed inside the electrically conductive light reflecting film, and is protected by the electrically conductive light reflecting film, it becomes possible to select the electrolysis solution in a wide range.

Thus, the electrochromic mirror of the first aspect of the present invention is easy to manufacture at low cost and, does not generate a double image, and is simple with high performance.

As the electrically conductive light reflecting film of the transparent substrate, since hydrogen atoms must permeate therethrough, a noble metal such as a metal of the platinum group, for example, platinum, rhodium or palladium, or an alloy containing any of them (e.g. an alloy of silver and a platinum group metal) is desirable. Particularly, since a noble metal of the platinum group degrades a hydrogen molecule and retains it in the atomic state due to its catalytic action, hydrogen atoms easily permeates therethrough. In addition, a noble metal of the platinum group, when a voltage is eliminated, has the action of absorbing hydrogen in the electrochromic film, and returning this to the electrolysis solution.

As the substrate of the present electrochromic mirror, a metal plate having electrical conductivity may be applied, and a material having a similar thermal expansion rate to that of the transparent substrate is preferable. For this reason, such a construction that a thin film having electrical conductivity such as a metal film or a transparent electrical conductive film is formed on a surface of the substrate formed of the same kind of material (e.g. glass, synthetic resin etc.) as that of the transparent substrate, and is used as the electrically conductive part (electrode film), is preferable.

An electrochromic mirror of a second aspect of the present invention includes a transparent substrate wherein an electrochromic film which is reduction-colored is formed on the back thereof, and an electrically conductive light reflecting film which is permeable to lithium atoms and has electrical conductivity is formed on the electrochromic film; a substrate which has an electrically conductive part having electrical conductivity on at least one side, and is provided in a vicinity of the transparent substrate in a state where the electrically conductive part faces the electrically conductive light reflecting film; and an electrolysis solution which contains at least a lithium ion and a material oxidizable with a neutral molecule or an anion, and is sealed between the electrically conductive light reflecting film of the transparent substrate and the electrically conductive part of the substrate.

In the electrochromic mirror of the second aspect of the present invention, the electrolysis solution is sealed between the electrically conductive light reflecting film formed on the transparent substrate and the electrically conductive part of the substrate. This electrolysis solution contains at least a lithium ion, and a material oxidizable with a neutral molecule or an anion.

Herein, when a negative voltage is applied to the electrically conductive light reflecting film of the transparent substrate, and a positive voltage is applied to the electrically conductive part of a substrate, for example, by an electric source apparatus (battery etc.) mounted in a vehicle, lithium ions contained in the electrolysis solution move to the side of the electrically conductive light reflecting film, pass as lithium atoms through the electrically conductive light reflecting film, and move to the side of the electrochromic film. For this reason, the following reduction reaction occurs in the electrochromic film.

$$x\text{Li}^+ + MO + e^- \underset{Coloring}{\overset{Decoloring}{\rightleftarrows}} \text{Li}_xMO \qquad (6)$$

Li$^+$ is a hydrogen ion, MO is a material for the electrochromic film, and e$^-$ is an electron. The material (MO) for this electrochromic film is most preferably tungsten trioxide (WO$_3$), molybdenum trioxide (MoO$_3$), or a mixture containing at least one of them.

On the other hand, as described above, the electrolysis solution contains a material oxidizable with a neutral molecule or an anion, and this is a construction ensuring the aforementioned reduction reaction of the electrochromic film.

That is, when an oxidizing neutral molecule is contained in the electrolysis solution, supposing this neutral molecule to be A, the following oxidation reaction occurs in a vicinity of the electrically conductive part of the substrate to which a positive voltage is applied, in the electrolysis solution.

$$A - e^- \rightleftarrows A^+ \qquad (7)$$

In addition, when an oxidizing anion is contained in the electrolysis solution, supposing this anion to be B, the following oxidation reaction occurs in a vicinity of the electrically conductive part of the substrate to which a positive voltage is applied, in the electrolysis solution.

$$B^- - e^- \rightleftarrows B \qquad (8)$$

Therefore, for example, when the material for the electrochromic film is WO$_3$, and an oxidizing neutral molecule is contained in the electrolysis solution, a whole reaction is as shown below, and the electrochromic film is reduction-colored.

$$x\text{Li}^+ + \text{WO}_3 + xA \underset{Coloring}{\overset{Decoloring}{\rightleftarrows}} \text{Li}_x\text{WO}_3 + xA^+ \qquad (9)$$

In addition, for example, when the material for an electrochromic film is WO$_3$, and an oxidizing anion is contained in the electrolysis solution, a whole reaction is as shown below, and the electrochromic film is reduction-colored.

$$x\text{Li}^+ + \text{WO}_3 + xB^- \underset{Coloring}{\overset{Decoloring}{\rightleftarrows}} \text{Li}_x\text{WO}_3 + xB \qquad (10)$$

(In order to match the formula (6) and the formula (7), an anion is contained in the electrolysis solution. The electrolysis solution does not need to be colored by the reaction in the electrolysis solution.)

Therefore, since light which is introduced into the transparent substrate from a surface side of the transparent substrate (a side opposite to a side on which the electrochromic film and the electrically conductive light reflecting film are formed) and is reflected by the electrically conductive light reflecting film is dimmed by passage through the colored electrochromic film, a reflectivity of the electrochromic mirror changes and the anti-glaring effect is exerted.

Moreover, the present electrochromic mirror has a simple construction wherein only two layers of films, namely the electrochromic film and the electrical conductive light reflecting film are formed on the transparent substrate, and the film quality, a film thickness and the like of these respective films hardly affect performance. Therefore, this leads to easy manufacturing at low cost.

In addition, since the electrochromic mirror has such a construction that light introduced into the transparent substrate is reflected by the electrical conductive light reflecting film formed on the back of this transparent substrate, occurrence of a double image is prevented.

Further, as the electrolysis solution, a highly reactive liquid is generally used in some cases, and the materials used in the electrochromic film such as tungsten trioxide and the like may be dissolved in the electrolysis solution little by little. Even in such a case, in the present electrochromic mirror, since the electrochromic film is formed inside the electrically conductive light reflecting film, and is protected by the electrically conductive light reflecting film, it becomes possible to select the electrolysis solution in a wide range.

Thus, the electrochromic mirror of the second aspect of the present invention is easy to manufacture at low cost and, moreover, does not generate a double image, and is simple with high performance.

As the electrical conductive light reflecting film of the transparent substrate, since lithium atoms must permeate therethrough, a noble metal such as a metal of the platinum group, for example, platinum, rhodium or palladium, or an alloy containing any of them (e.g. an alloy of silver and a platinum group metal) is desirable. Among them, rhodium has been found to make lithium atoms permeate well therethrough.

As the substrate for the present electrochromic mirror, a metal plate having electrical conductivity may be applied and a material having a thermal expansion rate close to that of the transparent substrate is preferable. For this reason, such a construction that a thin film having electrical conductivity such as a metal film or a transparent electrically conductive film is formed on a surface of the substrate formed of the same kind of material (e.g. glass, synthetic resin etc.) as that of the transparent substrate, and is used as the electrically conductive part (electrode film), is preferable.

In the electrochromic mirrors of the first aspect and the second aspect of the present invention (hereinafter, referred to as "electrochromic mirror of the present invention" in some cases), it is preferable that the electrically conductive part of the substrate is an electrode film having electrical conductivity formed on the substrate. For example, a material of the substrate can be a material having a thermal expansion rate close to that of the transparent substrate, being preferable.

In addition, the electrochromic mirror of the present invention is preferably constructed such that a material for the electrochromic film of the transparent substrate contains at least one of tungsten trioxide and molybdenum trioxide.

In the electrochromic mirror of the present invention, it is preferable that a material for the eclectically conductive light reflecting film of the transparent substrate is selected from a metal belonging to the platinum group, and an alloy of silver and a metal belonging to the platinum group.

In the electrochromic mirror of the present invention, it is preferable that a material for the electrically conductive light reflecting film of the transparent substrate is rhodium. Particularly, this is preferable in the case where a lithium ion is contained in the electrolysis solution.

In the electrochromic mirror of the present invention, it is preferable that the electrolysis solution is a gel containing a polymer or an inorganic substance that does not react with an electrolysis solution. This can prevent liquid leakage at breakage of the electrochromic mirror, being preferable.

FIRST EMBODIMENT

Figure 1:
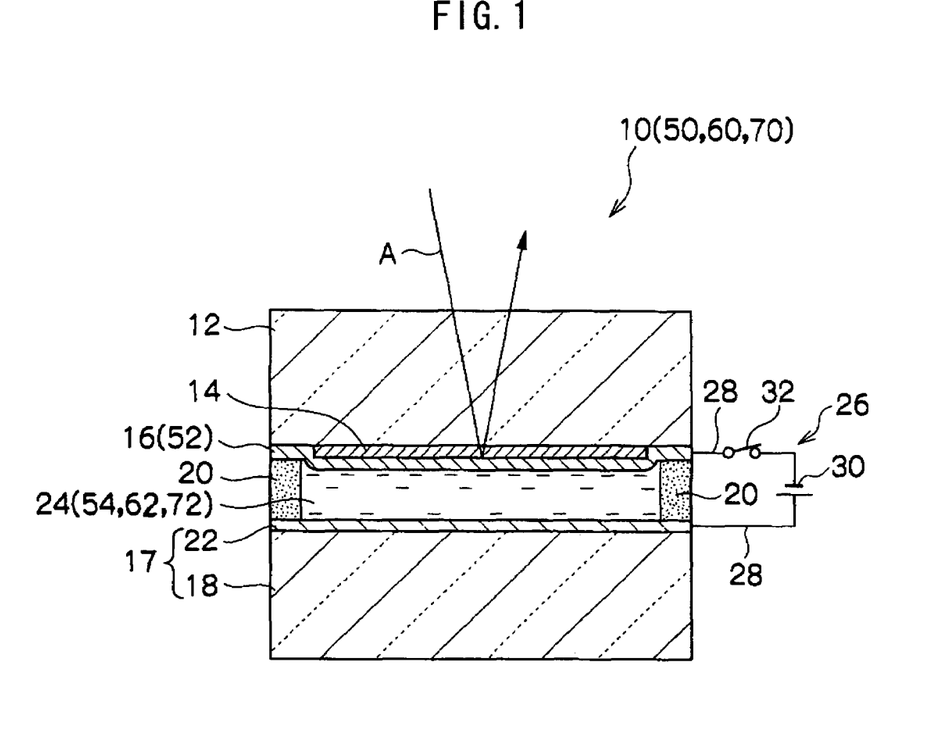
FIG. 1 is a cross-sectional view showing the construction of an electrochromic mirror of first to forth embodiments of the present invention.

FIG. 1 shows a construction of an electrochromic mirror 10 relating to a first embodiment of the present invention in a cross-sectional view.

The electrochromic mirror 10 is provided with a glass substrate 12 which is a transparent substrate. On the back (the lower side in FIG. 1) of this glass substrate 12, an electrochromic film 14 which is reduction-colored is formed as a thin film by means, for example, of vacuum deposition. A material for this electrochromic film 14 is tungsten trioxide ($WO_3$) in the present first embodiment.

On the back of the glass substrate 12, an electrically conductive light reflecting film 16 is formed as a thin film on this electrochromic film 14 by means, for example, of vacuum deposition. A material for this electrically conductive light reflecting film 16 is palladium in the present first embodiment.

At both ends in a width direction of the glass substrate 12 (both ends in left and right directions, in FIG. 1), the electrochromic film 14 is not formed, and the electrically conductive light reflecting film 16 is directly adhered to the glass substrate 12.

On the backside of the glass substrate 12, a substrate 17 is provided in a vicinity thereof. The substrate 17 has a construction having a glass substrate 18, and an electrode film 22, as an electrically conductive part, formed as a thin film on one side of the glass substrate 18 by means, for example, of vacuum deposition. Edge parts of the electrode film 22 side are adhered to the electrically conductive light reflecting film 16 with a sealing agent 20, in the state where the electrode film 22 side faces the electrically conductive light reflecting film 16. A material for this electrode film 22 is a metal such as chromium or the like in the present first embodiment.

Between the electrically conductive light reflecting film 16 of the glass substrate 12 and the electrode film 22 of the substrate 17, a space sealed with the sealing agent 20 is formed, and an electrolysis solution 24 is sealed in this space. The electrolysis solution 24 uses propylene carbonate as a solvent in the present first embodiment, and contains sulfuric acid ($H_2SO_4$) as a hydrogen ion agent, and ferrocene (Fe$(C_5H_5)_2$) as a neutral substance as an oxidizing agent.

An electric source apparatus 26 is connected to the electrical conductive light reflecting film 16 of the glass substrate 12 and the electrode film 22 of the substrate 17 via a wiring 28. The electric source 26 has a direct current electric source 30 and a switch 32, and is constructed such that, in the state where the switch 32 is "ON", a minus electrode of the direct current electric source 30 is connected to the electrically conductive light reflecting film 16, and a plus electrode of the direct current electric source 30 is connected to the electrode film 22. The electrically conductive light reflecting film 16 and the electrode film 22 are constructed such that they can be short-circuited via a not shown circuit.

Then, the action of the present first embodiment will be explained.

In the electrochromic mirror 10 having the aforementioned construction, when the switch 32 of the electric source apparatus 26 is operated to be "ON", a negative voltage is applied to the electrically conductive light reflecting film 16, and a positive voltage is applied to the electrode film 22 by the direct current electric source 30. For this reason, hydrogen ions contained in the electrolysis solution 24 move to the side of the electrically conductive light reflecting film 16, pass as hydrogen atoms through the electrically conductive light reflecting film 16, and move to the electrochromic film 14. Thereby, in the electrochromic film 14, the following reduction reaction occurs.

(11)

$H^+$ is a hydrogen ion, and $e^-$ is an electron.

Thereupon, in a vicinity of the electrode film 22 in the electrolysis solution 24, the following oxidation reaction occurs.

(12)

Therefore, as a whole, a reaction is as follows, and tungsten trioxide ($WO_3$) which is a material for the electrochromic film 14 is colored.

(13)

Thereby, since light which is introduced into the glass substrate 12 from a surface side of the glass substrate 12 and is reflected by the electrically conductive light reflecting film 16 (see arrow A in FIG. 1) is dimmed by passage through the colored electrochromic film 14, a reflectivity of the electrochromic mirror 10 changes, and the anti-glaring effect is exerted.

On the other hand, when the voltage applied to the electrically conductive light reflecting film 16 and the electrode film 22 is eliminated by operating the switch 32 of the electric source apparatus 26 to be "OFF" and, at the same time, the electrically conductive light reflecting film 16 and the electrode film 22 are short-circuited via the not shown circuit, hydrogen atoms which have reacted with the electrochromic film 14 are retuned into the electrode 24, and a color of tungsten trioxide ($WO_3$) which is a material for the electrochromic film 14 goes out.

Herein, the present electrochromic mirror 14 has a simple construction wherein only two layers of films, namely the electrochromic film 14 and the electrically conductive light reflecting film 16 are formed on the glass substrate 12, and the film thickness, film quality and the like of the electrochromic film 14 and the electrically conductive light reflecting film 16 hardly affect performance. Therefore, this leads to easy manufacturing at low cost.

In addition, the mirror is constructed such that light introduced into the glass substrate 12 from a surface side is reflected by the electrically conductive light reflecting film 16 formed on the back of this glass substrate 12, occurrence of a double image is prevented.

Thus, the electrochromic mirror 10 having the aforementioned construction is easy to manufacture at low cost, does not generate a double image, and is simple with high-performance.

Although the present first embodiment has a construction that sulfuric acid is used as a hydrogen ion agent contained in the electrolysis solution 24, the hydrogen ion agent is not limited to this. As the hydrogen ion agent contained in the electrolysis solution 24, a general acid can be used, and examples include hydrochloric acid, phosphoric acid, acetic acid, oxalic acid, formic acid, and perchloric acid.

In addition, in the present first embodiment, although ferrocene $(Fe(C_5H_5)_2)$ used as a neutral molecule (neutral substance) contained in the electrolysis solution 24 is a compound containing an iron, the neutral molecule (neutral substance) is not limited to this. As a neutral molecule (neutral substance) contained in the electrolysis solution 24, a compound which is generally called metallocene can be used.

SECOND EMBODIMENT

Next, a second embodiment of the present invention will be explained. Regarding the fundamentally same construction and action as those of the first embodiment, the same symbols as those of the first embodiment are given, and explanation thereof is not repeated.

As shown in FIG. 1, an electrochromic mirror 50 of the present second embodiment has the fundamentally same construction as that of the electrochromic mirror 10 of the first embodiment, but a material for the electrical conductive light reflecting film 52 is rhodium.

An electrolysis solution 54 for the electrochromic mirror 50 uses propylene carbonate as a solvent, and contains lithium perchlorate $(LiClO_4)$ as a lithium ion agent, and ferrocene $(Fe(C_5H_5)_2)$ which is a neutral substance as an oxidizing agent.

Other components have the same construction as that in the electrochromic mirror 10 relating to the first embodiment.

In the electrochromic mirror 50 having the aforementioned construction, when a switch 32 of an electric source apparatus 26 is operated to be "ON", a negative voltage is applied to an electrically conductive light reflecting film 16, and a positive voltage is applied to an electrode film 22 by a direct current electric source 30. For this reason, lithium ions contained in an electrode 54 move to the side of the electrically conductive light reflecting film 52, passe as lithium atoms through the electrical conductive light reflecting film 52, and move to an electrochromic film 14. Thereby, in the electrochromic film 14, the following reduction reaction occurs.

(14)

$Li^+$ is a lithium ion, and $e^-$ is an electron.

Thereupon, in a vicinity of the electrode film 22 in the electrolysis solution 54, the similar oxidation reaction to that of the formula (12) in the first embodiment occurs.

Therefore, as a whole, a reaction is as shown below, and tungsten trioxide $(WO_3)$ which is a material for the electrochromic film 14 is colored.

(15)

Thereby, since light which is introduced into a glass substrate 12 from a surface side of the glass substrate 12 and is reflected by the electrical conductive light reflecting film 52 (see arrow A in FIG. 1), is dimmed by passage through the colored electrochromic film 14, a reflectivity of the electrochromic mirror 10 changes, and the anti-glaring effect is exerted.

On the other hand, when a voltage is applied to the electrical conductive light reflecting film 52 and the electrode film 22 is eliminated by operating the switch 32 of the electric source apparatus 26 to be "OFF" and, at the same time, the electrically conductive light reflecting film 52 and the electrode film 22 are short-circuited via a not shown circuit, lithium atoms which have been reacted with the electrochromic film 14 is returned into the electrolysis solution 24 and a color of tungsten trioxide $(WO_3)$ which is a material for the electrochromic film 14 goes out.

In addition, although the present second embodiment has a construction that lithium perchlorate $(LiClO_4)$ is used as a lithium ion agent contained in the electrolysis solution 54, the lithium ion agent is not limited to this. As a lithium ion agent contained in the electrolysis solution 54, there is a lithium salt such as borofluoride $(LiBF_4)$ and lithium arsenofluoride $(LiAsF_6)$.

THIRD EMBODIMENT

Next, a third embodiment of the present invention will be explained. Regarding the fundamentally same construction and action as those of the first embodiment, the same symbols as those of the first embodiment are given, and explanation thereof is not repeated.

As shown in FIG. 1, an electrochromic mirror 60 of the present third embodiment has the fundamentally same construction as that of the electrochromic mirror 10 of the first embodiment, and has a construction that only an electrolysis solution is different from that of the first embodiment. An electrolysis solution 62 of the electrochromic mirror 60 has a construction that propylene carbonate is used as a solvent, and ferrocyanic acid ($H_4[Fe(CN)_6]$) is used as an electrolyte.

In this electrochromic mirror 60, when a switch 32 of an electric source apparatus 26 is operated to be "ON", and a negative voltage is applied to an electrically conductive light reflecting film 16, and a positive voltage is applied to an electrode film 22 by a direct current electric source 30, in an electrochromic film 14, the similar reduction reaction to that of the formula (11) in the first embodiment occurs.

On the other hand, in a vicinity of the electrode film 22 in the electrolysis solution 62, the following oxidation reaction occurs.

(16)

Therefore, as a whole, a reaction is as shown below, and tungsten trioxide ($WO_3$) which is a material for the electrochromic film 14 is colored.

(17)

Thereby, since light which is introduced into a glass substrate 12 from a surface side of the glass substrate 12 and is reflected by the electrical conductive light reflecting film 16 (see arrow A in FIG. 1) is dimmed by passage through the colored electrochromic film 14, a reflectivity of the electrochromic mirror 60 changes, and the anti-glaring effect is exerted.

FOURTH EMBODIMENT

Next, a fourth embodiment of the present invention will be explained. Regarding the fundamentally same construction and action as those of the first embodiment, the same symbols as those of the first embodiment are given, and explanation thereof is not repeated.

As shown in FIG. 1, an electrochromic mirror 70 of the present fourth embodiment has the fundamentally same construction as that of the electrochromic mirror 10 of the first embodiment and has a construction that only an electrolysis solution is different from that of the first embodiment. An electrolysis solution 72 of the electrochromic mirror 70 has a construction that water is used as a solvent, and potassium ferrocyanide ($K_4[Fe(CN)_6]$) is used as an electrolyte. In this case, as a hydrogen ion contained in the electrolysis solution 72, a hydrogen ion of water is used.

In this electrochromic mirror 70, when a switch 32 of an electric source apparatus 26 is operated to be "ON", and a negative voltage is applied to an electrically conductive light reflecting film 16, and a positive voltage is applied to an electrode film 22 by a direct current electric source 30, in an electrochromic film 14, the similar reduction reaction to that of the formula (11) in the first embodiment occurs and, in a vicinity of the electrode film 22 in an electrolysis solution 62, the similar oxidation reaction to that of the formula (16) in the third embodiment occurs.

Therefore, as a whole, a reaction is as shown below, and tungsten trioxide ($WO_3$) which is a material for the electrochromic film 14 is colored.

(18)

(A potassium ion ($K^+$) and a hydroxy ion ($OH^-$) not described in the formula (18) are not changed).

Thereby, since light which is introduced into the glass substrate 12 from a surface of the glass substrate 12 and is reflected by the electrically conductive light reflecting film 16 (see arrow A in FIG. 1) is dimmed by passage through the colored electrochromic film 14, a reflectivity of the electrochromic mirror 70 changes, and the anti-glaring effect is exerted.

In addition, in the first to fourth embodiments, when a construction that the electrolysis solution 24, 54, 62 or 72 is gelled by mixing an acryl resin into the electrolysis solution 24, 54, 62 or 72 is adopted, liquid leakage can be prevented at breakage of the electrochromic mirror 10, 50, 60 or 70.

In addition, in the first to fourth embodiments, when a construction that the electrolysis solution 24, 54, 62 or 72 is gelled by mixing silica into the electrolysis solution 24, 54, 62 or 72 is adopted, liquid leakage can be prevented at breakage of the electrochromic mirror 10, 50, 60 or 70.

INDUSTRIAL APPLICABILITY

According to the present invention, an electrochromic mirror which is easy to manufacture at low cost, does not generate double image, and is simple with high performance can be provided. An electrochromic mirror can be used as an indoor or outdoor rearview mirror of an automobile or the like, and the present invention has a great industrial utilization value.

EXPLANATION OF SYMBOLS

10 Electrochromic mirror
12 Glass substrate (transparent substrate)
14 Electrochromic film
16 Electrically conductive light reflecting film
17 Substrate
18 Glass substrate (substrate)
22 Electrode film (substrate)
24 Electrolysis solution
50 Electrochromic mirror
52 Electrically conductive light reflecting film
54 Electrolysis solution
60 Electrochromic mirror
62 Electrolysis solution
70 Electrochromic mirror
72 Electrolysis solution

What is claimed is:

1. An electrochromic mirror, comprising:
    a transparent substrate wherein an electrochromic film which can be reduction-colored is formed on the back thereof, and an electrically conductive light reflecting film which is permeable to hydrogen atoms is formed on the back of the electrochromic film,
    a substrate which has an electrically conductive part having electrical conductivity on at least one side, and is provided in a vicinity of the transparent substrate in a state where the electrically conductive part faces the electrically conductive light reflecting film, and
    an electrolysis solution which contains at least a hydrogen ion and a material oxidizable with a neutral molecule or an anion, and is sealed between the electrically conductive light reflecting film of the transparent substrate and the electrically conductive part of the substrate,
    wherein incident light enters said transparent substrate and is transmitted through said electrochromic layer and reflected off of said electrically conductive light reflecting film without being transmitted through said electrolysis solution.

2. The electrochromic mirror according to claim 1, wherein the electrically conductive part of the substrate is an electrode film having electrical conductivity and formed on the substrate.

3. The electrochromic mirror according to claim 1, wherein a material for the electrochromic film of the transparent substrate contains at least one of tungsten trioxide and molybdenum trioxide.

4. The electrochromic mirror according to claim 1, wherein a material for the electrically conductive light reflecting film of the transparent substrate is selected from a metal belonging to the platinum group, and an alloy of silver and a metal belonging to the platinum group.

5. The electrochromic mirror according to claim 1, wherein a material for the electrically conductive light reflecting film of the transparent substrate is rhodium.

6. The electrochromic mirror according to claim 1, wherein the electrolysis solution is a gel containing a polymer or an inorganic substance that does not react with the electrolysis solution.

7. An electrochromic mirror, comprising:

a transparent substrate wherein an electrochromic film which can be reduction-colored is formed on the back thereof, and an electrically conductive light reflecting film which is permeable to lithium atoms is formed on the back of the electrochromic film, a substrate which has an electrically conductive part having electrical conductivity on at least one side, and is provided in a vicinity of the transparent substrate in a state where the electrically conductive part faces the electrically conductive light reflecting film, and an electrolysis solution which contains at least a lithium ion and a material oxidizable with a neutral molecule or an anion, and is sealed between the electrically conductive light reflecting film of the transparent substrate and the electrically conductive part of the substrate, wherein incident light enters said transparent substrate and is transmitted through said electrochromic layer and reflected off of said electrically conductive light reflecting film without being transmitted through said electrolysis solution.

8. The electrochromic mirror according to claim 7, wherein the electrically conductive part of the substrate is an electrode film having electrical conductivity and formed on the substrate.

9. The electrochromic mirror according to claim 7, wherein a material for the electrochromic film of the transparent substrate contains at least one of tungsten trioxide and molybdenum trioxide.

10. The electrochromic mirror according to claim 7, wherein a material for the electrically conductive light reflecting film of the transparent substrate is selected from a metal belonging to the platinum group, and an alloy of silver and a metal belonging to the platinum group.

11. The electrochromic mirror according to claim 7, wherein a material for the electrically conductive light reflecting film of the transparent substrate is rhodium.

12. The electrochromic mirror according to claim 7, wherein the electrolysis solution is a gel containing a polymer or an inorganic substance which does not react with the electrolysis solution.

* * * * *